United States Patent [19]

Belanger

[11] 4,159,133
[45] Jun. 26, 1979

[54] FLEXIBLE VACUUM BELLOWS

[75] Inventor: J. Arthur Belanger, La Porte, Tex.

[73] Assignee: Air Products and Chemicals, Inc., Allentown, Pa.

[21] Appl. No.: 871,890

[22] Filed: Jan. 25, 1978

[51] Int. Cl.$^2$ .............................................. F16L 27/10
[52] U.S. Cl. .................................... 285/114; 285/226; 285/229
[58] Field of Search ............... 285/299, 300, 301, 226, 285/227, 228, 229, 114; 403/50, 51; 138/120

[56] References Cited

U.S. PATENT DOCUMENTS

| 1,626,772 | 5/1927 | Worden | 285/224 X |
| 1,968,715 | 7/1934 | Slade | 285/300 |
| 2,553,542 | 5/1951 | Bodine | 285/226 X |

FOREIGN PATENT DOCUMENTS

| 1400854 | 1/1969 | Fed. Rep. of Germany | 285/226 |
| 624687 | 9/1961 | Italy | 285/229 |
| 1344998 | 1/1974 | United Kingdom | 285/226 |

*Primary Examiner*—Dave W. Arola
*Attorney, Agent, or Firm*—E. Eugene Innis; Richard A. Dannells; Barry Moyerman

[57] ABSTRACT

An improved flexible vacuum bellows is provided for interconnecting flanged pipe sections which comprises a flexible tubular joint member having one or more radially inwardly extending U-shaped convolutions and having bores that align with and are penetrated by fastening means joining the tubular joint member to the pipe sections.

1 Claim, 4 Drawing Figures

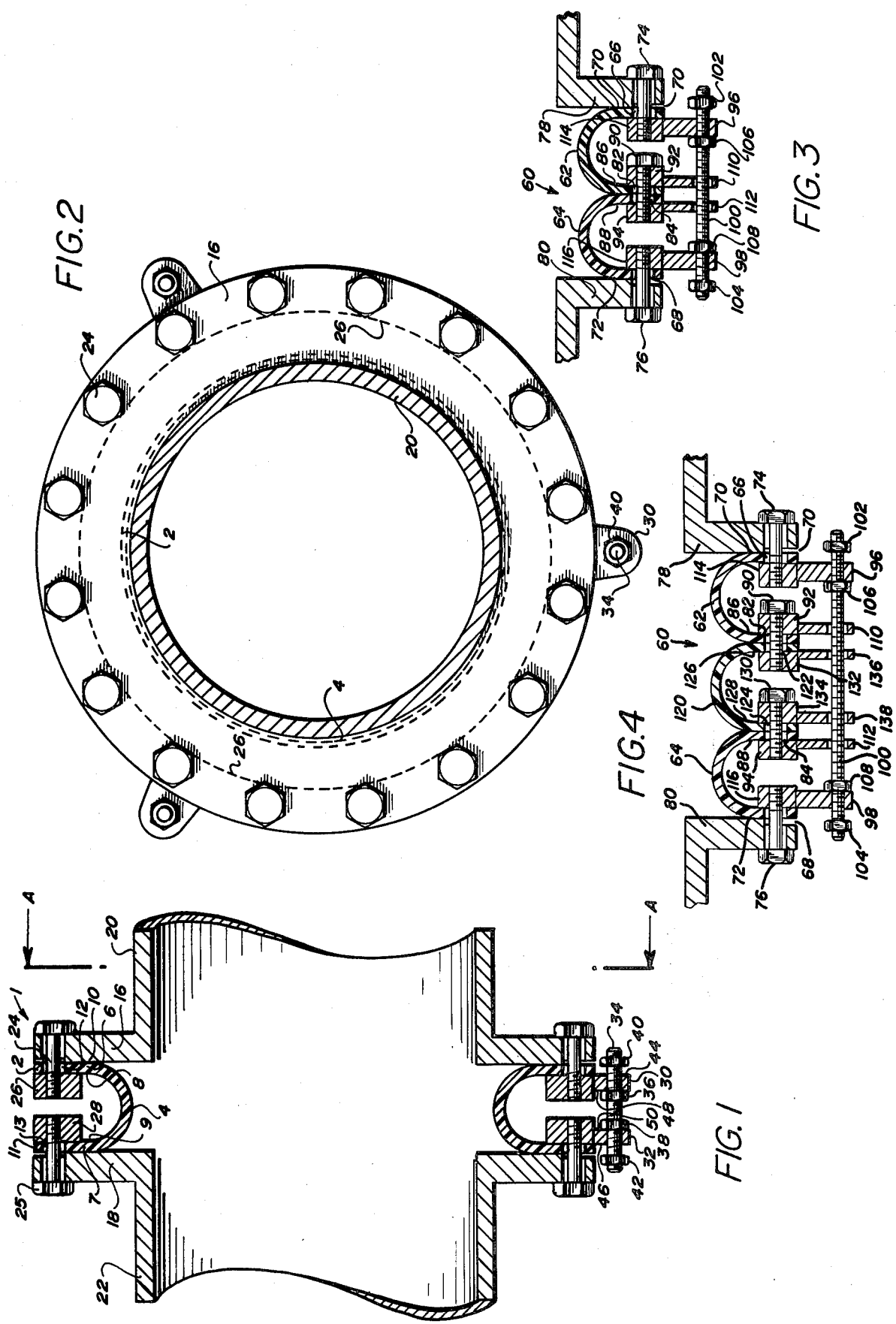

FLEXIBLE VACUUM BELLOWS

BACKGROUND OF THE INVENTION

1. Field of the Invention

The present invention is directed to improved flexible vacuum bellows or expansion joints for interconnecting flanged pipe sections. More particularly, this invention relates to an improved flexible expansion joint designed to operate under high vacuum and at relatively high temperatures and to function in acid or other highly corrosive fluid service.

2. Description of Prior Art

Materials that have been employed as flexible membranes in expansion joints in acid service include trifluoroethylene sold under the KEL-F trademark and polytetrafluoroethylene (TFE) which is sold under a variety of trademarks such as "TEFLON", "HALON", "FLUON", and others. For prior art expansion joints suitable for such service, see Lewis, U.S. Pat. No. 3,527,481 and Press et al, U.S. Pat. No. 3,633,945. The chief disadvantage of the flexible membranes employed in the prior art expansion joints is that they are all under compression, i.e., the membrane comprises one or more U-shaped convolutions which extend radially outward from the joint which would cause the membrane to collapse if employed in vacuum service.

In each of the prior art expansion joints for high pressure service, metallic expansion limiting rings are provided to prevent radial expansion of the flexible membrane. Internal metallic rings are also provided to prevent collapse in similar types of expansion joints comprising TFE materials for vacuum service. Bawcom et al, U.S. Pat. No. 3,139,115 is representative of the prior art for such vacuum bellows.

In one design of an expansion joint, flexible membranes having inwardly extending U-shaped convolutions are employed in an entirely different manner and for an entirely different purpose than that employed in the present invention; see Hall, U.S. Pat. No. 1,992,612. In the prior art expansion joint, a tubular membrane of a ductile metal possessing a high elasticity and durability is secured between a wall of an inner cylindrical joint member and an end ring of an outer cylindrical joint member. When the expansion joint is under conditions of expansion, the high pressure within the pipe sections is transmitted from the joint to the portion of an annular chamber between the inner wall of the outer expansion member and the inwardly extending convolution of the flexible member. Such an expansion joint is inapplicable to operation under vacuum since the convolutions would collapse to the inner wall of the outer flexible membrane.

SUMMARY OF THE INVENTION

In accordance with the present invention, a flexible vacuum bellows is provided which overcomes the disadvantages mentioned above by avoiding the use of the relatively expensive and complex metallic internal rings, and enables one to operate under high vacuum service without the tendency of the flexible membranes to collapse. This is the case because the membrane of this invention is entirely under tension (hoop stress) and not compression as in the membranes of the prior art.

The bellows of this invention comprises a flexible tubular joint membrane having at least one radially inwardly extending U-shaped convolution and having at least one bore therethrough alignably oriented and penetrable by means for fastening the tubular joint membrane to the pipe sections to be interconnected.

BRIEF DESCRIPTION OF THE DRAWINGS

The invention and the manner in which it distinguishes from the prior art will be apparent from the description when read in conjunction with the drawings in which:

FIG. 1 is a sectional elevation view of one embodiment of this invention;

FIG. 2 is a sectional elevation view of one embodiment of this invention taken along line A—A of FIG. 1;

FIG. 3 is a partial sectional elevation view of another embodiment of this invention; and FIG. 4 is a partial sectional elevation view of still another embodiment of this invention.

DETAILED DESCRIPTION OF THE INVENTION

Referring now to FIGS. 1 and 2, one embodiment of the flexible bellows of this invention is shown in which flexible membrane 1 comprises a single inverted convolution 2 having a U-shaped surface 4 and radially peripheral surfaces 6 and 7 having inner peripheral faces 8 and 9 and outer peripheral faces 10 and 11 and a plurality of radially spaced bores 12 and 13 positioned on the peripheral surfaces 6 and 7. For the nominal 16-inch diameter pipe of this embodiment, 16 bores as shown are adequate. The number of bores in the bellows increases approximately linearly with an increase in the nominal diameter of the pipe to be interconnected. Thus, a 30-inch pipe requires that the membrane contains 32 bores.

Flexible membrane 1 is positioned between flanges 16 and 18 of pipe sections 20 and 22, respectively so that bores 12 and 13 are aligned with the bores in flanges 16 and 18 and are penetrated by bolts 24 and 25 to fasten membrane 1 to pipe sections 20 and 22. Bolts 24 and 25 are screwed into back-up flanges 26 and 28 which are adjacent inner peripheral faces 8 and 9. In place of the back-up flanges, nuts can be threaded onto the bolts in a well-known manner.

Lugs 30 and 32 and spacer rods 34 are provided to maintain membrane 1 in alignment about the axis of the pipe sections and in this embodiment about its horizontal axis. Lugs 30 and 32 are radially spaced around the periphery of back-up flanges 26 and 28. Spacer rods 34 are journeled through lug 30, inner nuts 36 and 38 are threaded onto rods 34 and rods 34 are journeled through lugs 32. Outer nuts 40 and 42 are threaded onto rods 34 in such a relationship with inner nuts 36 and 38 to allow for some axial deflection of membrane 1. On maximum axial deflection of membrane 1, outer faces 44 and 46 of lugs 30 and 32, respectively contact outer nuts 40 and 42. On minimum axial deflection of membrane 1 as illustrated in FIG. 1, inner faces 48 and 50 of lugs 30 and 32 contact inner nuts 36 and 38. Thus, inner nuts 36 and 38 serve to limit axial movement when flexible membrane 1 is under vacuum.

FIG. 2 shows 3 pairs of lugs. It is obvious that a greater or lesser number of pairs can be provided to effect a higher or lower assurance against horizontal misalignment.

Another embodiment of the flexible bellows of this invention is illustrated in FIG. 3 in which flexible membrane 60 is shown comprising two single inverted convolutions 62 and 64 having bores 66 and 68 on its outer radially peripheral surfaces 70 and 72 which are alignably oriented and penetrated by bolts 74 and 76 of flanges 78 and 80, respectively. Bores 82 and 84 on inner radially peripheral surfaces 86 and 88 are in alignment with and penetrated by bolts 90. Bolt 90 is threaded into retaining rings or flanges 92 and 94 and is tightened against peripheral surfaces 86 and 88, respectively.

Lugs 96 and 98 and spacer bar 100 are fastened by means of outer nuts 102 and 104 and inner nuts 106 and 108 in the same manner as described in FIGS. 1 and 2. Guide lugs 110 and 112 are radially positioned around the periphery of back-up flanges 92 and 94 in alignment with the lugs 96 and 98 and encircle spacer bar 100 to permit maximum axial deflection. The amount of deflection is controlled by limiting the space between outer nuts 102 and 104 and inner nuts 106 and 108 in the same manner as in flexible membrane 1 of FIGS. 1 and 2. Guide lugs 110 and 112 maintain back-up flanges 82 and 84 aligned with respect to back-up flanges 114 and 116 and limit lateral deflection of flexible membrane 60.

Still another embodiment of the flexible bellows of this invention is illustrated in FIG. 4 which is the same as that illustrated in FIG. 3 except that flexible membrane 60 has a third inverted convolution 120 having bores 122 and 124 on its inner radially peripheral surfaces 126 and 128 which are alignably oriented and penetrated by bolts 90 and 130, respectively. Bolt 90 is threaded into retaining rings 92 and 132 and is tightened against peripheral surfaces 86 and 126, respectively. Bolt 130 is threaded into retaining rings 134 and 94 and is tightened against peripheral surfaces 128 and 88, respectively.

Guide lugs 136 and 138 are radially positioned around the periphery of back-up flanges 132 and 134 in the same manner as described in FIG. 3.

Each convolution making up the present bellows of the invention must form either a semi-circular or catenary shape in its position of minimum deflection when the convolutions are mounted between the flanges of the pipe section as shown in FIGS. 1 to 4. This will cause each convolution to maintain its same relative shape without deformation throughout the operation of the bellows under vacuum.

The thickness of the flexible membrane is calculated from the following hoop stress equation in which the bellows is operated under a high vacuum of about 2 mm. Hg:

$$f = pl/2t$$

wherein:
f = the maximum allowable working tensile stress of membrane material at the operation temperature.
p = 14.7 pounds per square inch (1.04 kg./cm$^2$).
l = the length of span between flanges for each convolution in inches.
t = the thickness in inches.

For an operating temperature of about 300° F. (149° C.) and a 6-inch (15.2 cm.) span between flanges, the thickness of flexible membrane comprising TFE is about 3/16 inch (0.475 cm.).

While fluorinated polymers have been enumerated above as being suitable materials of construction for the flexible membrane of the bellows of this invention, other materials such as styrene-butadiene rubber and the like can be employed. In addition, other modifications can be made to this invention without departing from its spirit thereof. All such modifications that fall within the scope of the appended claims are intended to be embraced thereby.

I claim:
1. A flexible vacuum bellows for interconnecting two relatively rigid flanged pipe sections comprising:
  two back-up flanges,
  a flexible tubular joint membrane having more than one radially inwardly extending U-shaped convolution each having
    a U-shaped surface and two radially peripheral surfaces,
    two of said convolutions having outer radially peripheral surfaces adjacent to each of said flanged pipe sections, and inner radially peripheral surfaces, and any remaining convolutions having inner radially peripheral surfaces,
    a plurality of bores radially spaced on each of said outer radially peripheral surfaces alignably oriented and penetrated by means for respectively fastening each of said surfaces between each of said back-up flanges and each of said flanged pipe sections, and a plurality of bores on each of said inner radially peripheral surfaces and penetrated by means for respectively fastening said inner peripheral surfaces to each other,
  means for maintaining said tubular joint membrane in alignment about the axis of said flanged pipe sections comprising
    at least one pair of lugs radially spaced around the periphery of said back-up flanges, spacer rods journaled through each pair of said lugs and
    means for fastening said lugs to said spacer rods while permitting some axial deflection of said tubular joint membrane, and
    at least one pair of guide lugs is mounted on said means for fastening said inner peripheral surfaces to each other, said guide lugs encircling said spacer rods to permit freedom of movement in the space provided between said lugs on said back-up flanges.

* * * * *